United States Patent [19]

Gorke et al.

[11] Patent Number: 4,619,951

[45] Date of Patent: Oct. 28, 1986

[54] SEALING COMPOSITIONS FOR ELECTRIC CABLES

[75] Inventors: Klaus Gorke, Dorsten; Josef Schoppen, Haltern, both of Fed. Rep. of Germany

[73] Assignee: Chemische Werke Huls Aktiengesellschaft, Marl, Fed. Rep. of Germany

[21] Appl. No.: 778,440

[22] Filed: Sep. 20, 1985

[30] Foreign Application Priority Data

Oct. 23, 1984 [DE] Fed. Rep. of Germany ....... 3438780

[51] Int. Cl.$^4$ .......................... C08L 9/00; C08K 3/26; C09D 5/25; H01B 3/18
[52] U.S. Cl. .................................... 523/173; 524/424; 524/426; 524/504; 524/517; 524/526
[58] Field of Search ............... 524/424, 425, 426, 517, 524/504, 526; 523/173

[56] References Cited

U.S. PATENT DOCUMENTS

| | | | |
|---|---|---|---|
| 4,239,807 | 12/1980 | Feldmann et al. | 428/475.8 |
| 4,352,906 | 10/1982 | Reed et al. | 524/426 |
| 4,444,924 | 4/1984 | Grimmer | 523/455 |
| 4,447,564 | 5/1984 | Grimmer | 523/455 |

FOREIGN PATENT DOCUMENTS

| | | |
|---|---|---|
| 3104196 | 10/1981 | Fed. Rep. of Germany . |
| 3300750 | 7/1984 | Fed. Rep. of Germany . |
| 2538808 | 7/1984 | France . |
| 0109237 | 8/1981 | Japan . |
| 0763398 | 9/1980 | U.S.S.R. . |

*Primary Examiner*—Herbert J. Lilling
*Attorney, Agent, or Firm*—Oblon, Fisher, Spivak, McClelland & Maier

[57] ABSTRACT

The present invention relates to a method of manufacturing sealing compositions for electric wires, wherein one mixes together a filler (comprised chiefly of an alkaline earth carbonate), a binder component, and possibly additives of the type common in the art.

The binder component is a combination of two binders: binder I is a homopolymer of 1,3-butadiene or a copolymer which is essentially obtained from 1,3-butadiene; and binder II is a polymer based on 1,3-butadiene and having laterally extending succinic anhydride groups.

The sealing compositions are distinguished by good processability and high dielectric strength.

9 Claims, No Drawings

SEALING COMPOSITIONS FOR ELECTRIC CABLES

BACKGROUND OF THE INVENTION

1. Field of the Invention

The invention relates to a method of manufacturing sealing compositions for electric cables.

2. Discussion of the Background

Sealing compositions for electric cables should have the following combination of properties:

(a) One should be able to prepare the composition by simple mixing of components which can be obtained readily and at favorable cost (economy).

(b) The composition should be easily processible, i.e. it should be possible to pour the composition at ambient temperature.

(c) The composition should be characterized by a high dielectric strength (high breakdown voltage for a given electrode separation), and accordingly by a high electrical insulation value (safety).

The production of sealing compositions for electric cables by mixing PVC, inorganic fillers, and additives is known. Such compositions have properties a and b supra. However, they are deficient as to property c.

Japanese OS No. 56-109,237 discloses sealing compositions for electric cables prepared by mixing a binder component, an inorganic filler, and additives. The binder component is comprised of a liquid polybutadiene and other binding agents. With these compositions as well, the combination of properties described supra is unsatisfactory however.

Accordingly, there remains a strongly felt need both for sealing compositions for electric cables and a method of manufacturing such sealing compositions, where the compositions can be prepared by simple mixing of readily available components, are easily processed, and are also characterized by high dielectric strength and a high electrical insulation value.

SUMMARY OF THE INVENTION

Accordingly, it is an object of this invention to provide a novel method for manufacturing a sealing composition for electric cables which can be prepared by simple mixing of readily available components.

It is another object of this invention to provide a novel method for manufacturing a sealing composition for electric cables which is easily processed, i.e. it should be possible to pour the composition at ambient temperature.

It is another object of this invention to provide a novel method for manufacturing a sealing composition for electric cables which is characterized by high dielectric strength and/or a high electrical insulation value.

It is another object of this invention to provide a novel method for manufacturing a sealing composition for electric cables which is prepared by simple mixing of readily available components, which is readily processed, and which is characterized by high dielectric strength and/or a high electrical insulation value.

It is another object of this invention to provide a novel sealing composition for electric cables which meets each of the above objects of this invention.

These and other objects have now surprisingly been satisfied by the discovery of the following novel method for preparing sealing compositions for electric cables, in which the following components are mixed together: (1) a binder component; and (2) an inorganic, water-insoluble, powdered filler material. Other additives well known in this art (but not vulcanizing agents) may also be added to components (1) and (2) supra.

The novel method of the present invention is characterized by the following features.

a. The binder component is a combination of two binders—binder I (in an amount of 70–97 wt. %), and binder II (in an amount of 3–30 wt. %);

a.1 Binder I is a homopolymer of 1,3-butadiene or a copolymer based on 1,3-butadiene (in an amount of $\geq 80$ wt. %) and at least one other copolymerizable 1,3-diene or 1,3-cyclodiene or at least one other copolymerizable alpha-olefin (in an amount of $\leq 20$ wt. %) (with the indicated composition of the said copolymer determined by IR analysis). The homopolymer or copolymer may be modified by isomerization or partial cyclization; its average relative molecular weight (referred to hydrogen), $\overline{M}n$, is 500 to 5,000, and its viscosity (at 20° C. according to DIN 53 015) is 2–80 dPa-sec.

a.2 Binder II is a polymer based on 1,3-butadiene with laterally extending succinic anhydride groups (i.e., a maleinized polymer based on 1,3-butadiene) with an acid number of 15 to 150 (mg KOH/g); this polymer is prepared by adding maleic anhydride to a polymer of the type of binder I (feature a.1).

b. The filler material is comprised of at least 80 wt. % of an alkaline earth carbonate which has not been provided with a hydrophobic coating and which is capable of reacting with the anhydride groups of binder II. The filler is present in an amount of 65–80 wt. % of the total sealing composition.

The present invention also provides a novel sealing composition prepared in accordance with the above method. This novel sealing composition is characterized by the advantages outlined above.

DESCRIPTION OF THE PREFERRED EMBODIMENTS

In exploratory experiments, compositions were prepared by simple mixing of liquid polybutadiene, finely powdered chalk, and a fatty acid such as linoleic acid, soybean oil fatty acid, and castor oil fatty acid (i.e., ricinoleic acid). These compositions satisfied requirements a and b supra, but not requirement c.

However, using the method of the present invention, a novel composition satisfying all three of requirements a, b, and c has been obtained for the first time.

The method of the present invention thus relates to the preparation of sealing compositions for electric cables comprising (1) a binder component, and (2) an inorganic, water-insoluble, powdered filler material. Other additives (other than vulcanizing agents) which are well known in this art may also be added to components 1) and (2) supra.

The method of this invention is characterized as follows.

a. The binder component is a combination of two binders—binder I (in an amount of 70–97 wt. %), and binder II (in an amount of 3–30 wt. %).

a.1 Binder I is a homopolymer of 1,3-butadiene or a copolymer based on 1,3-butadiene (in an amount of $\geq 80$ wt. %) and at least one other co-polymerizable 1,3-diene or 1,3-cyclodiene or at least one other copolymerizable alpha-olefin (in an amount of $\leq 20$ wt. %) (with the indicated composition of the said copolymer determined by IR analysis). The homopolymer or copolymer may be modified by isomerization or partial cyclization, its average relative molecular weight (referred to hydrogen), $\overline{M}n$, is 500 to 5,000, and its viscosity (at 20° C. according to DIN 53 015) is 2–80 dPa-sec.

a.2 Binder II is a polymer based on 1,3-butadiene with laterally extending succinic anhydride groups (i.e., a maleinized polymer based on 1,3-butadiene) with an acid number of 15 to 150 (mg KOH/g). This polymer is prepared by adding maleic anhydride to a polymer of the type of binder I (feature a.1).

b. The filler material is comprised of at least 80 wt. % of an alkaline earth carbonate which has not been provided with a hydrophobic coating and which is capable of reacting with the anhydride groups of binder II. The filler is present in an amount of 65–80 wt. % of the total sealing composition.

Preferably, the method of preparing sealing compositions is further characterized as follows.

c. The binder component is comprised of binder I in an amount of 80–95 wt. % and binder II in an amount of 5–20 wt. %.

c.1 Binder I is a homopolymer of 1,3-butadiene. It has a content of $\leqq 50$ wt. % (based on IR analysis) of recurring units obtained by 1,4-trans polymerization of 1,3-butadiene. It has an average relative molecular weight (based on hydrogen), $\overline{M}n$, of 1,000 to 4,000, and it has viscosity 6–60 dPa-sec.

c.2 Binder II has an acid number of 30–100. It is prepared by adding maleic anhydride to a polymer which is a homopolymer of 1,3-butadiene with a content of $\leqq 50$ wt. % of recurring units obtained by 1,4-trans polymerization of 1,3-butadiene. It has an average relative molecular weight, $\overline{M}n$, of 1,000 to 3,000, and has viscosity 6–40 dPa-sec.

d. The filler material is a natural calcium carbonate or calcium magnesium carbonate. Its particle size distribution is characterized as follows (by sieve analysis): 90 wt. % <5–150 micron, and <35 wt. % <1 micron. The filler is present in an amount of 70–78 wt. % (based on the total weight of the sealing composition).

Binder I supra can be prepared in a known fashion by anionic polymerization, particularly with an organolithium catalyst. A Lewis base may be used as a co-catalyst. Such a Lewis base may be ethers, tertiary amines, or mixtures of ethers and tertiary amines. These ethers and tertiary amines are well known in the art.

The content of recurring units obtained by 1,4-trans polymerization of 1,3-butadiene in binder I is $\leqq 50$ wt. % (as determined by IR analysis). Preferably, binder I is prepared by Ziegler polymerization, and a nickel catalyst may be preferably used.

The copolymers, which are an alternative for binder I supra may be based on 1,3-butadiene and at least one 1,3-diene or 1,3-cyclodiene copolymerizable with 1,3-butadiene, e.g., isoprene or cyclopentadiene, and/or at least one copolymerizable alpha-olefin, e.g., styrene or ethylene.

Binder II, supra, is prepared by a known fashion by adding maleic anhydride (MA) to a polymer (binder I) corresponding to feature a.1 or c.1 method of this invention outlined supra (for method, see, e.g., German No. AS 23 62 534).

As a rule, the amount of binder II used is greater the lower its acid number, and the greater the surface area of the filler (i.e., the smaller the particle sizes of the filler material).

For reasons of cost, a maximum degree of filler consistent with good processibility is generally added to the sealing compositions. In this connection, it is advantageous to select a filler with a particle size distribution corresponding to the following criteria: 90 wt. % <4.5–300 microns, and <40 wt. % <1 micron.

Other additives may include, e.g., fire retardants, smoke inhibitors, drying agents (e.g., molecular sieves), and siccatives (e.g., cobalt octoate). All of these are well known in this art.

The invention also provides a novel sealing composition for electric cables prepared in accordance with the novel method. The composition comprises a binder component and an inorganic, water-insoluble, powdered filler material.

The binder component is a combination of two binders, a binder I in an amount of 70–97 wt. %, and a binder II in an amount of 3–30 wt. %. Binder I is a homopolymer of 1,3-butadiene or a copolymer based on 1,3-butadiene in an amount of at least 80 wt. % and at least one other co-polymerizable 1,3-diene or 1,3-cyclodiene, or at least one other copolymerizable alpha-olefin in an amount of no more than 20 wt. %.

The homopolymer or the copolymer have an average relative molecular weight, $\overline{M}n$, of 500 to 5,000, and a viscosity of 2–80 dPa-sec.

Binder II is a polymer based on 1,3-butadiene with laterally extending succinic anhydride groups and has an acid number of 15 to 150 (mg KOH/g).

The filler material is comprised of at least 80 wt. % of an alkaline earth carbonate which has not been provided with a hydrophobic coating and which is capable of reacting with the anhydride groups of binder II. The filler is present in the amount of 65–80 wt. % of the total sealing composition.

In a preferred embodiment, the binder component is comprised of binder I in an amount of 80–95 wt. %, and binder II in an amount of 5–20 wt. %.

Binder I is a homopolymer of 1,3-butadiene and having a content of not more than 50 wt. % of recurring units obtained by 1,4-trans-polymerization of 1,3-butadiene, and having an average relative molecular weight, $\overline{M}n$, of between 1000 and 4000 and a viscosity of between 6 and 60 dPa-seconds.

Binder II has an acid number of 30–100 and is prepared by adding maleic anhydride to a polymer which is a homopolymer of 1,3-butadiene with a content of not more than 50 wt. % of recurring units obtained by 1,4-trans polymerization of 1,3-butadiene and having a molecular weight, $\overline{M}n$, of 1000 to 3000 and a viscosity of 6 to 40 dPa-sec.

The filler material is a natural calcium carbonate or calcium magnesium carbonate, having a particle size distribution as follows (by sieve analysis): 90 wt % <5–150 microns, and 35 wt. % <1 micron. The filler is present in an amount of 70–78 wt. % based on the total weight of the sealing composition.

Other features of this invention will become apparent in the course of the following description of exemplary embodiments which are provided for purposes of illustration and are not intended to be limiting thereof.

The average relative molecular weights, $\overline{M}n$, reported in the examples below were determined from vapor pressure measurements.

The viscosities were determined at 20° C. according to DIN 53 015.

The acid numbers were determined according to DIN 53 402.

The dielectric strengths were determined according to the following procedure: A 50 Hz a.c. test voltage was applied via a variable transformer (primary side 0–220 V, secondary side 0–30 kV), between two spherical electrodes (diameter 12.5 mm, separation 2.0 mm) which were immersed in the composition being tested at ambient temperature. The voltage was increased slowly, starting at O V and rising continuously until breakdown occurred.

TABLE 1

| | Polymers employed (all commercially available) | | | | |
|---|---|---|---|---|---|
| | Average relative molecular weight* | Viscosity (dPa-sec) | Microstructure** | | |
| | | | 1,4-cis | 1,4-trans | vinyl |
| Polybutadiene 1 | ca. 1500 | 7.5 | ca. 72 | 27 | 1 |
| Polybutadiene 2 | ca. 3000 | 30 | ca. 80 | 19 | 1 |
| Polybutadiene 3 | ca. 1300 | 11 | ca. 10 | 45 | 45 |
| Polybutadiene 4 | ca. 1150 | 60 | — | — | >85 |
| Polybutadiene A | ca. 6200 | 300 | ca. 85 | 12 | 3 |
| Polybutadiene B | ca. 2600 | 100 | ca. 10 | 45 | 45 |

*based on the weight of a hydrogen atom, $\overline{M}n$
**requiring units obtained by 1,4-cis-, 1,4-trans, and 1,2-polymerization of 1,3-butadiene, as determined by IR analysis, %

Polybutadienes 1, 2, and A were obtained by Ziegler polymerization with a nickel catalyst.

The binders I1 to I4, IA, and IB correspond to polybutadienes 1 to 4, A, and B, respectively.

TABLE 2

| | Binders II, obtained by adding maleic anhydride to polybutadiene 1. | |
|---|---|---|
| | Added maleic anhydride (wt. % of the adduct) | Acid number (mg KOH/g) |
| Binder II1.1 | 7.5% | ca. 75 |
| Binder II1.2 | 3% | ca. 30 |
| Binder II1.C | 0.5% | ca. 5 |

Preparation of the Sealing Compositions 90 parts by weight of binder I and 10 parts by weight of binder II (Table 3) were mixed together in a mixer (Hobart-Mischer, Type N5D) at room temperature. Then 300 parts by weight of a commercially available pulverized chalk (not hydrophobicized, i.e. uncoated; comprised of calcium carbonate in the amount of ca. 92 wt. % and magnesium carbonate in the amount of ca. 1 wt. %; with 90 wt. % comprised of particles <7 micron and 26 wt. % comprised of particles <1 micron, by sieve analysis) was added in portions and mixed in.

The resulting compositions were characterized (Table 3) via their flow properties as determined qualitatively while being poured out of the mixer, and via their dielectric strength as determined by the above-described method.

Table 3: Characteristics of sealing compositions. (Examples 1 to 5 correspond to the invention. Examples a to c are comparison examples not in accordance with the invention.)

TABLE 3

| Example No. | Binder Combination | Characteristics of sealing compositions | | Remarks |
|---|---|---|---|---|
| | | Flow properties | Dielectric strength kV* | |
| 1 | I1–II1.1 | Very good | 20 | |
| 2 | I1–II1.2 | Good | 25 | |
| a | I1–II1.C | Poor | 30 | See Table 2 - the acid number of binder II1.C is too low |
| 3 | I2–II1.1 | Good | 19 | |
| b | IA–II1.1 | Poor | 20 | See Table 1 - the viscosity of binder IA is too high |
| 4 | I3–II1.1 | Very Good | 21 | |
| c | IB–II1.1 | Poor | 20 | See Table 1 - the viscosity of binder is too high |
| 5 | I4–II1.1 | Good | 19 | |

*(kV, measured at an electrode separation of 2.0 mm) (average of three measurements).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A sealing composition for electric wires comprising:
   a binder component; and
   an inorganic, water-insoluble, powdered filler material;
   wherein:
   a. the binder component is a combination of two binders—binder I (in an amount of 70–97 wt. %), and binder II (in an amount of 3–30 wt. %);
   a.1 binder I is a homopolymer of 1,3-butadiene or a copolymer based on 1,3-butadiene (in an amount of ≧80 wt. %) and at least one other copolymerizable 1,3-diene or 1,3-cyclodiene or at least one other copolymerizable alpha-olefin (in an amount of ≦20 wt. %) (with the indicated composition of the said copolymer determined by IR analysis); the average relative molecular weight (referred to hydrogen), $\overline{M}n$, of the homopolymer or copolymer is 500 to 5,000, and its viscosity (at 20° C. according to DIN 53 015) is 2–80 dPa-sec;
   a.2 binder II is a polymer based on 1,3-butadiene with laterally extending succinic anhydride groups (i.e., a maleinized polymer based on 1,3-butadiene) with an acid number of 15 to 150 (mg KOH/g); this polymer being prepared by adding maleic anhydride to a polymer of the type of binder I (feature a.1); and b. the filler material is comprised of at least 80 wt. % of an alkaline earth carbonate which has not been provided with a hydrophobic coating and which is capable of reacting with the anhydride groups of binder II; said filler being present in an amount of 65-80 wt. % of the total sealing composition.

2. The sealing composition of claim 1, wherein the said homopolymer or copolymer of feature a.1 is modified by isomerization or partial cyclization.

3. The sealing composition of claim 1, wherein:

c. the binder component is comprised of binder I in an amount of 80-95 wt. % and binder II in an amount of 5-20 wt. %;

c.1 binder I is a homopolymer of 1,3-butadiene; and has a content of $\leq 50$ wt. % (based on IR analysis) of recurring units obtained by 1,4-trans-polymerization of 1,3-butadiene; an average relative molecular weight (based on hydrogen), $\overline{M}n$, of 1,000 to 4,000; and a viscosity of 6-60 dPa-sec;

c.2 binder II has an acid number of 30-100; and is prepared by adding maleic anhydride to a polymer which is a homopolymer of 1,3-butadiene with a content of $\leq 50$ wt. % of recurring units obtained by 1,4-trans-polymerization of 1,3-butadiene; and has $\overline{M}n = 1,000$ to 3,000; and a viscosity of 6-40 dPa-sec; and d. the filler material is a natural calcium carbonate or calcium magnesium carbonate; its particle size distribution is characterized as follows (by sieve analysis): 90 wt. % <5-150 micron, and <35 wt. % <1 micron; and the said filler is present in an amount of 70-78 wt. % (based on the total weight of the sealing composition).

4. The sealing composition of claim 1, wherein the said sealing composition comprises a fire retardant, a smoke inhibitor, a drying agent or a siccative.

5. The sealing composition of claim 4, wherein the said drying agent is a molecular sieve or wherein the said siccative is cobalt octoate.

6. The sealing composition of claim 1, wherein said binder I is prepared by Ziegler polymerization.

7. The sealing composition of claim 6, wherein the said Ziegler polymerization is carried out with a nickel catalyst.

8. The sealing composition of claim 3, wherein the said binder I is prepared by Ziegler polymerization.

9. The sealing composition of claim 8, wherein the said Ziegler polymerization is run with a nickel catalyst.

* * * * *